United States Patent [19]

Adams, Jr. et al.

[11] 3,792,202

[45] Feb. 12, 1974

[54] DIAL UP CONFERENCE CIRCUIT

[75] Inventors: John A. Adams, Jr., Altamonte Springs, Fla.; Ernest D. Lee, Jr., Fairport; Karl Wichlajew, Penfield, both of N.Y.

[73] Assignee: Stromberg-Carlson Corporation, Rochester, N.Y.

[22] Filed: Apr. 26, 1972

[21] Appl. No.: 247,832

[52] U.S. Cl. .................... 179/18 BC

[51] Int. Cl. .................... H04m 3/56

[58] Field of Search .................... 179/18 BC

[56] References Cited

UNITED STATES PATENTS 3,660,610 5/1972 Hestad .................... 179/18 BC

*Primary Examiner*—William C. Cooper

*Attorney, Agent, or Firm*—William F. Porter, Jr.

[57] ABSTRACT

A conference circuit for an automatic telephone system is provided with a dedicated line circuit in addition to plurality of party stations, each of which is connected to the concentrator matrix of the system. Through the system a conference may be set up by a local party dialing the conference code, by a distant party, connected via a trunk, which has been extended by an attendant to a dedicated line circuit, through the attendant's turret, or by transfer of a trunk connection via a local party and code dialing.

20 Claims, 9 Drawing Figures

DIAL UP CONFERENCE CIRCUIT

The present invention relates in general to telephone systems and more particularly to a dial up conference circuit for use with a PBX telephone system.

In the telephone art, there are various arrangements which relate to conferencing and the setting up of conference calls. For example, there exists a "meet me" type of conference circuit, as described in the U.S. Pat. No. 3,354,175, issued Oct. 13, 1970 to R.R. Schultz, and wherein a plurality of subscribers dial a particular code number at a pre-arranged time, whereby a conference among the subscribers is established. In another type of conference system, the conference must be controlled in its entirety by a separate attendant and does not permit the addition of additional parties after the conference is set up. There is also the type of conference system such as described in U.S. Pat. No. 3,322,901, issued May 30, 1967 to D.R. Trimmer, which may consist of local conference stations and an additional central office station. In this type of system, an attendant may assist in setting up a conference, yet it is always a local subscriber who has complete control over the conference. This type of system has the drawback of not permitting the attendant to gain access to the conference without a local conference party's control, i.e. a local party is always required to set up the conference even though the assistance of the attendant may be employed. To overcome this and other deficiencies of such systems, the conference circuit of the present invention has been developed.

The present invention is directed to a dial up conference system which may be controlled by an originating local station or by an attendant. Individual stations are controlled according to a class of service designation.

The conference circuit is equipped with five outlets to a switching matrix and has access to the system registers and an attendant. A dedicated line circuit is also provided to permit access to a central office trunk. While five stations is the maximum number which may be set up in addition to a central office party, this number is not limitative.

Through the use of the system of the present invention, there exist four different ways for seizing the conference circuit. When a local party desires to set up a conference, he merely dials the conference code. When a distant party, connected via a trunk, desires to set up a conference, the attendant extends the trunk to a dedicated line circuit set aside for this specific purpose. Also, the attendant may independently depress a conference kay on her turret to seize the conference circuit. Finally, if a trunk call exists and during the conversation it becomes evident that a conference is desired, the local party transfers the trunk to the dedicated line circuit mentioned above and then hangs up. The local party then goes off hook and dials the conference code. The local party then connects other local parties to the conference and finally the trunk is brought into the conference under control of the originating local party.

Accordingly, it is an object of the present invention to provide a telephone system having a dial-up conference circuit, whereby a plurality of parties may be connected to the conference by procedures carried out by an individual local party.

It is an additional object of the present invention to provide a conference circuit which may provide a connection between a plurality of local parties and an additional party — a central office trunk party may be connected to the conference.

It is still a further object of the present invention to provide a telephone system employing a dial up conference circuit which may be set up by an attendant separate from the control by the parties.

It is still another object of the present invention to provide a telephone system which employs a conference circuit which, when set up, cannot be accessed by any party desiring to be included in the conference so as to ensure conferency privacy.

In accordance with one feature of the present invention, a conference circuit is provided with a dedicated line circuit in addition to a plurality of station inlets. Each of the station inlets and the dedicated line circuit is connected to the switching matrix of the telephone system. The attendant and a separate register may be accessed by the circuit and, in addition, a central office party may obtain access to the conference through a central office trunk and the dedicated line circuit. When a conference is to be set up by a local party, the local party originating the conference (originator) lifts his received to go "off-hook" and receives dial tone. The originator is distinct from other local parties in that he alone has the capability to add parties to the conference. The conference access code is then dialed so that the conference circuit may be seized. The orginator then flashes the conference circuit with his switch hook, receives dial tone from the assigned register and, if it is desired to include a central office party in the conference, dials the central office trunk code and, upon seizure again receives dial tone. The originator now dials the number of the central office party, and after an answer, the originator informs the central office party of the conference. The originator then transfers himself and the central office party to the conference buss by flashing the hook switch. If the originator has made an error when dialing the central office party or if the central office party is busy, the originator must replace his receiver to release the conference circuit and to release the central office trunk.

With the next hook switch flash signal, the originator is split away from the conference buss and hears dialtone when a register is attached. The originator may then dial the number of an additional local party and inform him of the conference. After agreement, the originator transfers himself and local party number-two to the conference buss by using the hook switch flash signal. Additional local parties, up to a total of five, may be added to the conference in the same manner as local party number-two.

Another feature of the present invention is the addition of a central office trunk to an existing conference with the attendant's assistance. If the originator desires to add a central office party to an already existing conference, the attendant must be asked for assistance. In this case, the originator flashes with his hook switch and receives dial tone when a register is attached to the conference circuit. The party then dials the attendant's code (usually "zero"). The attendant is signalled and answers the call by pressing the conference key/lamp combination on her turret and talks to the originator of the conference. The attendant then connects the local party to the conference buss by pressing the release split key on her turret. The attendant next keys the access code of the central office trunk and a trunk is allotted and extended through the switching matrix to the conference circuit's dedicated line circuit. The attendant is then switched automatically from the conference circuit to the allotted trunk. Next, the attendant dials or keys the number of the central office party and, after the party answers, the attendant informs him of the conference. The attendant then presses the "ATTENDANT Release" key to disconnect from the central office trunk and connect the central office party to the conference buss.

A conferee may leave the conference at any time by hanging up, and new conferees may be added at any time by the originator or by the attendant, provided that a vacancy exists in the conference. If the originator leaves the conference and then desires to get back into the conference and continue his function, he may do so with the attendant's assistance.

In accordance with a further feature of the present invention, a conference can be set up by the attendant. If a central office party is to be included, the attendant keys the central office trunk code and automatically is connected to a central office trunk. The attendant then dials or keys the number of the central office party and, after an answer, the central office party is informed of the conference. Next, the attendant presses the local split key and keys the number of the dedicated line circuit of the conference circuit. The central office trunk is extended to the dedicated line circuit and rings into it. The attendant then presses the conference trunk key to enter the conference circuit. Ringing is tripped and the central office party is now connected to the conference buss. The attendant then keys the number of the first local party and converses with that party. To transfer local party number one to the conference buss, the attendant merely presses the release split key. Additional parties may be added in the same manner.

These and other features, objects and advantages of the present invention will become more apparent from the following detailed description thereof when taken in conjunction with the accompanying drawings, which illustrate one embodiment of the present invention and wherein:

FIG. 1 if a schematic block diagram of a PABX telephone system including the dial up conference circuit of the present invention;

The principles of the present invention are described in detail below in conjunction with an exemplary PBX telephone system of the common control type. Since the present invention is not restricted to use in association with this or any other particular telephone system, it should be understood that the specific telephone system described herein is presented only for purposes of facilitating and understanding of the present invention. Accordingly, only those detailed features of the disclosed common control system which are important to the operation of the present invention have been described in detail.

GENERAL SYSTEM DESCRIPTION

Figure 1:
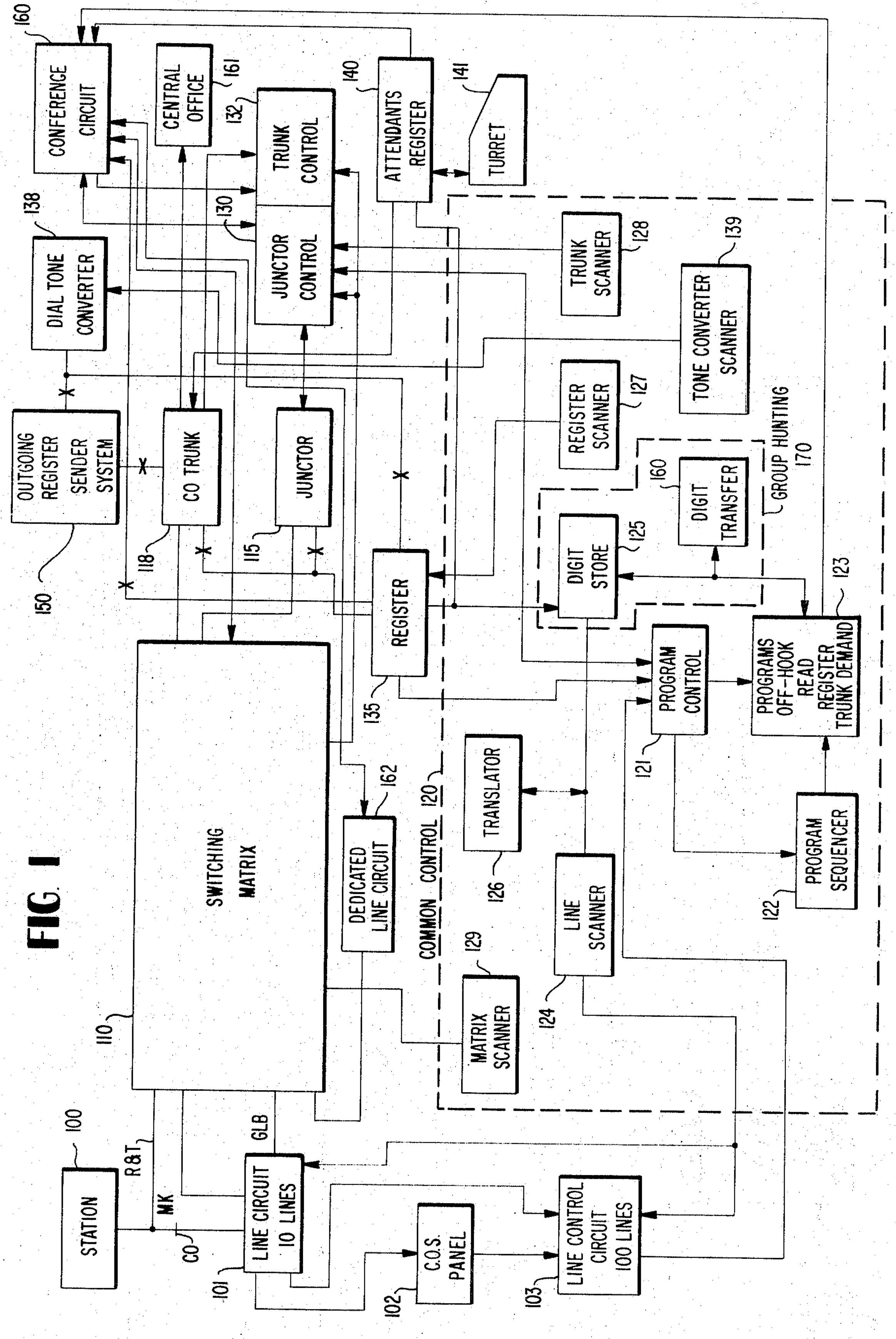

FIG. 1 illustrates an over-all block diagram of a common control PBX system capable of connecting one station to another station or to a central office via a trunk circuit under control of the common control circuit. The system provides a plurality of stations 100 (of which only a single station is illustrated in FIG. 1 for purposes of simplicity) with each group of 10 stations 100 being serviced by a line circuit 101 associated with a particular input of the switching matrix 110. The switching matrix 110 is typical matrix network formed of three stages of reed relay switches providing a plurality of paths between a given input connected to one of the plurality of stations 100 and a given output, connectable to a junctor, a central office trunk 118 or a conference circuit 160. All of the switching functions of the system are controlled by the common control circuit 120 which performs the functions for an off-hook program, a read register program and a trunk demand program. One or more junctor controls 130 and trunk controls 132, along with a plurality of registers 135 are also provided for purposes of effecting connection of a particular station requiring service to the common control equipment, so that the operations necessary for the establishment of a communication connection with the PBX or outside thereof to the central office may be performed. A class of service panel 102 is provided for each group of 100 lines and indicates, for the respective stations served by the line circuit, special classes of service which are available for the stations and particular equipment which may be available or used thereby, such as tone-dial equipment as opposed to rotary dial.

The common control 120 is divided into several separate functional circuits which serve to control the program of operations carried out to perform the switching process, including the path checking and selection required for connection of a station requesting service to a register or central office trunk. A line control circuit 103 accommodating 10 line circuits 101 serves as an interface between the common control 120 and the individual line circuits 101. The common control 120 typically includes a program control 121 which selects the program to be run in order to satisfy a request for service, a program sequencer 122 and a program 123, which implement the program selected by the program control circuit 121. The program control 121 programs sequencer 122 and program circuit 123 may typically take the form of a wired logic or other programmed system of the type well known in the art. The various control signals emanating from this control area of the common control 120 have not been illustrated in detail in FIG. 1 but are shown in the subsequent figures where necessary for an understanding of the operation of the dial up conference circuitry of the present invention.

The common control 120 also includes a line scanner 124 which determines the line demanding service on an originating call and identifies and acts as a line marker when terminating a call. A translator 126 is also provided and serves the functions normally associated with a line scanner 124, and the register 135, which is external to the common control, for receiving the digits placed in the register. A register scanner 127 examines the status of the registers and register-senders, in order to determine whether an idle register or an outgoing register sender is available for use in connection with a calling station or defined the register demanding service, in order to complete a call. A trunk scanner 128 and matrix scanner 129 are associated with the path selecting and checking operation performed in connection with the switching matrix 110, the trunk scanner 128 serving the junctors 115 and the central office trunks 118 through the junctor control circuit 130 or trunk control 132, to determine those which may be available to a calling station through the switching matrix 110. The matrix scanner 129 serves to scan the links in the switching matrix 110 in the process of establishing a path from a given calling station through the switching matrix in accordance with a system disclosed in copending application Ser. No. 37,772, filed May 15, 1970 in the name of Ernest O. Lee, Jr. and assigned to the same assignee as the present application. This copending application also includes a detailed description and illustration of the switching matrix 110 and the various elements including a junctor control 130 and trunk control 132 along with other elements required for the path finding operation. In order to provide attendant service in the system, an attendant's register 140 and turret are connected to the central office trunks 118 and registers 135 to provide service for incoming and outgoing calls. Also associated with the attendant's register and turret is the dial up conference circuitry of the present invention. A conference circuit 160 is associated with the attendant's register 140, the program circuit 123, the junctor control 130, the trunk control 132, register 135, a dedicated line circuit 162 and switching matrix 110.

Also associated with the attendant's register, which can be employed to control the dial up conference circuitry of the present invention, are the central office trunks 118, which are connected to the central office 161 and to the outgoing register sender 150. In addition, a dedicated line 162 is connected to the switching matrix 110 and to the conference circuit 160.

Typical operation of the system shown in FIG. 1 is initiated by a subscriber at a given station 100 lifting the handset of his telephone, which results in the closing of a direct current loop to the tip T and ring R leads of the line, thereby signalling the associated line circuit 101 of a demand for service. The demand is placed through the associated line control circuit 103 to a common control 120 for an off-hook program, and the common control causes the scanner 124 to scan over the lines to identify the particular line requesting service. Upon identifying the line requesting service, the class of service check is made through the COS panel 102 to determine whether the line has a rotary line class of service or a multi-frequency class of service, information which is necessary to determine whether the tone dial converter 138 is necessary for the establishment of a call.

The common control 120 causes the line circuit 101 to place a negative mark on its mark lead, which is connected to an input of the switching matrix 110. The common control 120 then actuates the matrix scanner 129 initiating the path checking and selecting operations, which will select a single path through the switching matrix 110 from the station 100 requesting service. The common control 120 also causes the trunk scanner 128 to scan over the junctors 115 through a junctor control 130 for an idle junctor, and the register scanner 127 to select an idle register. The cross points of the selected matrix path are operated at this time, connecting the calling line through the junctor through the selected register. Dial tone is returned to the calling line from the register through the switching matrix and, at this time, the common control releases and is available to handle additional requests for service. After receiving dial tone, the subscriber dials one or more digits which are received and stored in the register 135. The common control analyzes the digits dialed as they are received to determine whether the call to be established is a local call, an outgoing trunk call or a special request for service.

In the case where a conference call is to be set up, such a call may be set up by a local party or the attendants. When a local party at station 100, for example, desires to set up a conference of up to five local parties and one central office party, he lifts his receiver to go off hook and receive dial tone. The local party then dials a conference code and seizes the conference circuit 160. By flashing with his switch the local party will receive dial tone so that he may dial the central office trunk code and will receive dial tone upon seizure of the central office trunk 118. The number of the central office party within the central office 161 is dialed and, after an answer, the local party informs the central office party of the conference. The local party at station 100 then transfers himself and the central office party to the conference 160 by flashing the hook switch on his telephone. With the next hook switch flash, the local party is split away from the conference buss and hears dial tone when a register 135 is attached. The originating party at station 100 then dials the number of another local party and informs him of the conference. After subsequent agreement, the originator transfers himself and local party number-2 to the conference buss by again using the hooked switch flash signal. An additional three local parties can be added in the same manner.

Where a local party desires to add a central office party to an already existing conference, the attendant must be asked for assistance.

Assuming that a conference of local parties has already been established, the originating party flashes with the hook switch, and receives dial tone when register 135 is attached. The originator then dials the attendant's code to signal the attendant at her turret 141. The attendant answers the call by pressing the conference lamp key on her turret 141 and talks to the originating party. The attendant then connects the local station 100 to the conference circuit 160 by pressing the release split key on her turret. She then keys the access code of a central office trunk 118 and a trunk is allotted and extended through the matrix 110 to the dedicated line circuit 162 and the attendant is switched automatically to the allotted trunk. The central office trunk lamp on the attendant's turret flashes, while the conference lamp changes to a steady illumination signal. The attendant then dials or keys the number of the central office party within the central office 161 and after that party answers, the attendant informs him of the conference. The attendant then presses the attendant release key on her turret 141 to disconnect from the central office trunk 118 and connect the central office party 161 to the conference circuit 160.

If a local party at station 100 has made an incorrect flash and is then removed from the conference circuit by staying "on hook" too long, the local party may then dial the attendant's code. The attendant is signalled through the attendant's register 140 at her turret 141 and she presses the attendant's trunk key. After advising the attendant that he wishes to rejoin the conference, the originator hangs up. The attendant presses the conference key and then the local split key and now keeps the number of the local party who is to be brought back into the conference. After the local party answers, the attendant presses the release split key and then the attendant release key to reconnect the local party to the conference buss.

The conference may also be set up entirely by the attendant, wherein the central office party is connected to the conference initially. The attendant keys, at turret 141, the central office trunk code for the central office trunk 118 and automatically is connected to a central office trunk. The attendant then hears dial tone and dials or keys the number of the central office party 161. After an answer, the central office party is informed of the conference. The attendant then presses the local split key on turret 141 and keys the number of the dedicated line circuit 162 of the conference circuit 160. The central office trunk 118 is extended to the dedicated line circuit 162 and rings into it. The attendant then presses the conference tunk key and the conference lamp provides an indication of a change in state of the conference circuit. Ringing is tripped and the central office party 161 is connected to the conference buss 160. The attendant then keys the number of the first local party at station 100 and, after an answer, presses the release split key on her turret 141 to transfer the local station 100 to the conference circuit 160. The other four local parties can be added in the same manner as local station 100.

Figure 7:
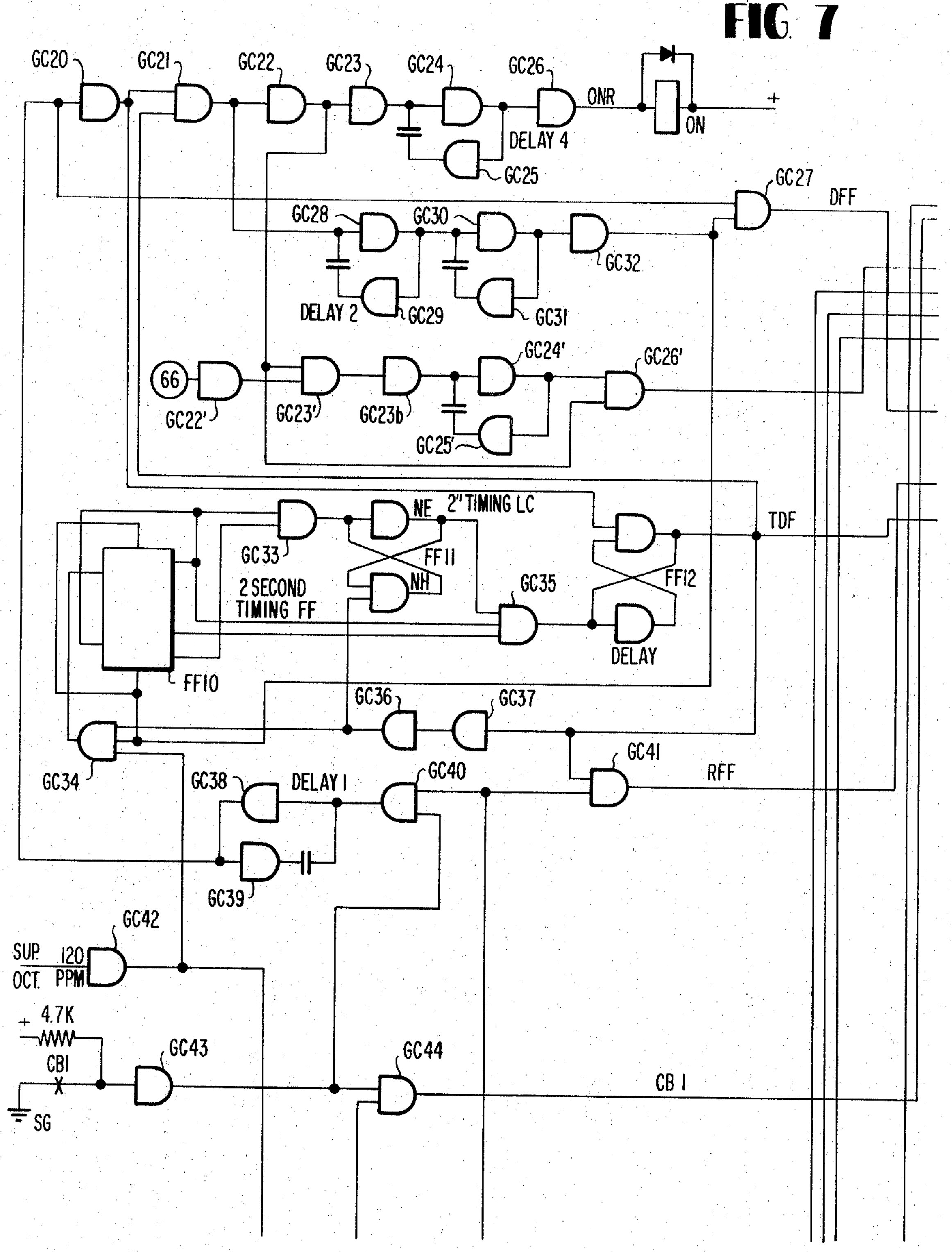
Figure 8:
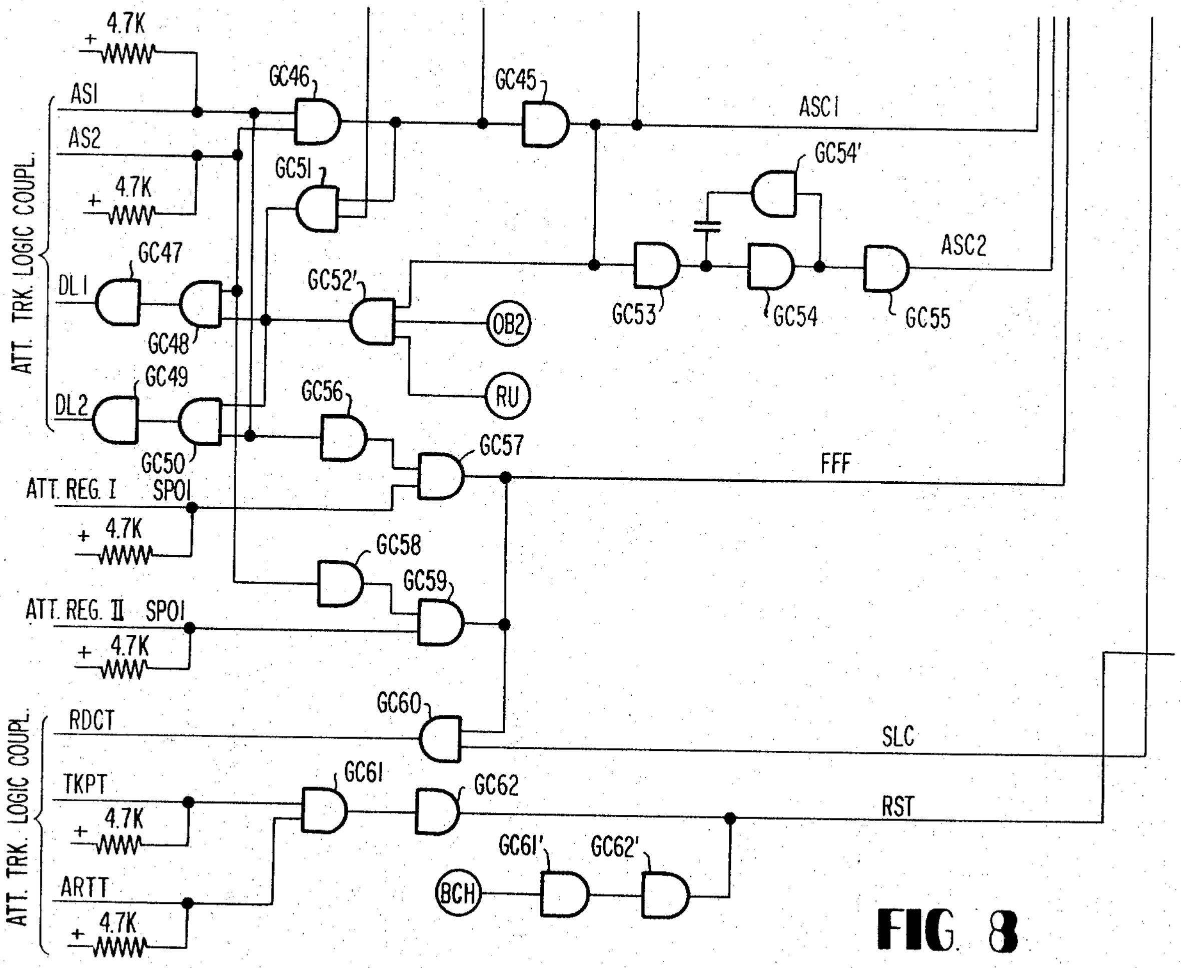
Figure 9:
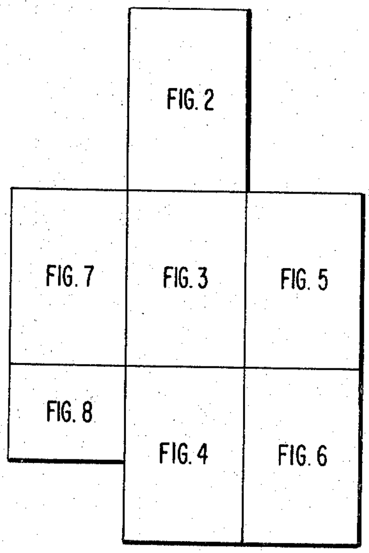
FIG. 9 shows the manner in which FIGS. 2 through 8 should be arranged for a clear understanding of the details of the present invention.

Specific details of the dial up conference circuit of the present invention are shown in FIGS. 2 through 8, which should be arranged as shown in FIG. 9 and will be discussed in more detail hereinafter.

DETAILED DESCRIPTION

Throughout the description of the circuitry for and the operation of the dial up conference circuit of the present invention, the following lead designations are employed.

FUNCTION OF EXTERNAL LEADS

| Lead Designation | Description of Designation | Function of Lead |
|---|---|---|
| ARTT | Attendant Releases From Trunk | Ground Pulse When Attendant Releases From this Circuit |
| AS1 | First Attendant Associated | Ground When Attendant Connected |
| AS2 | Second Attendant Associated | Ground When Attendant Connected |
| BT | Busy Tone | Interrupted Tone |
| BTL | Bright Trunk Lamp | Controls Bright Signals on Trunk Lamp |
| CAT | Control Attached to Trunk | Ground When Control is Attached to Trunk (M Relays Operated) |
| CAC | Control Atached Conference | For Matrix Scanning of Corresponding Position |
| CAJ | Control Attached Junctor | |
| CDIT | Call Dialed Inward | Ground When Battery Feed is Required |
| CLK | Called Line Busy | Control Connects Ground to Indicate Called Line is Busy |
| CMC | Call Master Control | Grounded by Trunk When Service by Common Control is Required |
| SPO1<br>SPO2 | Split | Ground When Attendant Starts Dialing |
| CT | Continuous Ringing | Continuous Ringing Potential |
| DL1 | 1st Dim Lamp | Controls Dim Signals on Trunk Lamp on 1st Attendant's Turret |
| DL2 | 2nd Dim Lamp | Controls Dim Signal on Trunk Lamp on 2nd Attendant's Turret |
| DT2 | Dedicated - Tip | To Dedicated Line Circuit |
| DR2 | Dedicated - Ring | |
| DS2 | Dedicated - Sleeve | |
| DSC | Disconnect | Grounded in Response To "Release Local" Key on Turret |
| DST | Disconnect Switch Train | Ground Pulses Provided by Control When Matrix Paths May be Released |
| HST | Hold Switch Train | Ground from Control Indicates Matrix Path Should be Held |
| MKAT | M Relay - Attendant | Ground When Control is Attached to an Attendant's Register Which is also Connected to this Circuit |
| MK1-MK5 | Mark | Ground Identifies Conference Trunk Outlets No. 1-5 for a Matrix Scan |
| MKR(1-3) | M Relay-Register | Ground When Control is Attached to a Register Which is also Connected to this Circuit |
| MR | Machine Ringing | Interrupted Ringing Potential (on 1 sec/off 3 sec.) |
| OGC | Outgoing Call | Ground From Control Indicates Trunk is being Allotted for an Outgoing Call |
| OP | Operator | Ground From Control Indiates Trunk is to Recall the Attendant |
| OPM | Operate M | Positive Potential Operates M Relay When Control is Attached |
| OXP | Operate Crosspoints | Ground Operates Matrix Path From Trunk to Station |
| R1-T1 | Ring and Tip | Loop Signals and Transmission To Matrix Outlest No. 1 to 5 Respectively |
| RAR | Request a Register | Ground Signals Control to Allot a Register |
| RBT | Ring Back Tone | Interrupted Ringing Tone (on 1 sec/off 3 sec.) |
| RDCT | | Ground Indicates Matrix Path is Established from Conf. Trunk to a Station |
| RG | Ring | Ground From Control Signals Conference CCT. to Ring Called Station |
| TLT | Ring and Tip | Transmission from Attendant to Conference Buses |
| TOT | Ring and Tip | Battery Feed From Attendant to Conference Buses |
| RR(1-3)<br>TR(1-3) | Ring and Tip | Loop Signals and Transmission from Conf. Trunk to Associated Register (1-3) Respectively |
| S1-S5 | Sleeve | Ground Holds Matrix Path No. 5 respectively |
| SIG | Signal | Ground Signals Attendant that There is a Call to be Answered |
| SR(1-3) | Supervisory | Negative When Idle Register is Scanned |
| TA | Trunk Available | Ground When Conf. Trunk is Idle |
| TTC | Trunk to Trunk Consult | Ground When Trunk Code is Dialed |
| TKPT | Trunk Key Pressed | Ground Pulse When Attendant Answers Conf. CCT. |
| 120PPM | 120 Pulses per Minute | Ground Pulses (On .25 sec/off .25 sec) |

LEADS FROM CONFERENCE LOGIC CIRCUIT TO THE TRANSMISSION CIRCUIT

| Lead Designation | Description of Designation | Function of Lead |
|---|---|---|
| AB | | Operate C2 Relay |
| ARY | A Relay | Operate Path |
| BCH | | Ground When Conf. Trunk is Idle |
| BRY | | Operate Relay F |
| BTR | BT Relay | Operate Path |
| BYR | | Operate Path of Conf. 1-Rel. |
| CB (CB1) | | Logic Ground Indicates Loop Supervision From PBX Party No. 1 |
| DETR (1) | 1 Relay | Operate Relay 1 |
| DPR | DP Relay | Operate Path |
| ER | | Operate Path of Con. 2-Rel. |
| MBK | Make Busy Key | Ground I dicates Trunk Made Artificially Busy |
| MIR | MI Relay | Operate Path |
| MRY | M Relay | Logic Ground Indicating Common Control Attached |
| ONR | ON Relay | Operate Path |
| OPR | OP Relay | Operate Path |
| P1 | | Control of Sleeve No. 1 |
| P2 | | Control Sleeve of Dedicated Line |

| | | |
|---|---|---|
| PCC | | Operate C1 Relay |
| RB | Resistance Battery | Logic Ground Indicates PWB Has Not Been Unplugged or −48 Volt Fuse Blown |
| RGR | RG Relay | Operate Path |
| RT | Ring Tip | Ground Indicates that Called Party Has Answered |
| RU | | Detect Ground on DS2 |
| SCOR(6) | | Operate Relay 6 |
| SRGR | SRG Relay | Operate Path |
| SUP | | Mark Path of Dedicated Line |
| XFR | XF Relay | Operate Path |
| XFSR(BF) | BF Relay | Operate Path |

LEADS FROM CONFERENCE LOGIC CIRCUIT TO CONFERENCE TRANSMISSION JUNCTOR

| Lead Designation | Description of Designation | Primary Function of Relay |
|---|---|---|
| B1(B2) | B Relay | Switches through transmission Path |
| C1(C2) | C Relay | Switches Through transmission Path |
| CB2(CB4) | CB2Relay | Loop Supervision |
| CB3(CB5) | CB3 Relay | Loop Supervision |
| FB1 (FB2) | | Monitors for Blown Fuse or Unplugged PWB |
| RLY2 (RLY4) | Relay 2 (4) | Connect Transmission Path to Conference Bus |
| RLY3(RLY5) | Relay 3 (5) | Connect Transmission Path to Conference Bus |
| SC1 (SC3) | | Sleeve Control 1 |
| SC2(SC4) | | Sleeve Control 2 |

LEADS FROM CONFERENCE TRANSMISSION CIRCUIT (TRUNK) TO CONFERENCE TRANSMISSION (JUNCTOR)

| Lead Designation | Description of Designation | Primary Function of Leads |
|---|---|---|
| CFMK | — | Conference Mark Lead |
| CFC | — | Conference Sleeve |
| CHR | — | Conference Ring Lead |
| CHT | — | Conference T Lead |
| CFR | — | Consultation Ring Lead |
| CFT | — | Consultation T Lead |

FUNCTION OF RELAYS

| Relay Description | Description of Designation | Primary Function of Relay |
|---|---|---|
| A,B,C,D,E | | Connect Matrix Outlet No. 1-5 to PBX Partys |
| BF | Battery Feed | During Consultation |
| BT | Busy Tone | Connects Busy Tone |
| CB1-CB5 | | Battery Feed and Loop Supervision for PABX Party's No. 1-5 |
| C1 | Conference 1 | Connects Party No. 1 to Conference Bus |
| C2 | Conference 2 | Connects Attendant to Conference Bus |
| CON 1 | Consultation 1 | Connects Party No. 1 to Consulted Party |
| CON2 | Consultation 2 | Connects Attendant to Consulted Party |
| DP | Dial PULSE | Repeats Dial Pulses to Register |
| F | | Connects Dedicated Line Circuit to Conference Bus |
| K1, K2, K3 | Coupler | Connects Trunk to 1st, 2nd, 3rd Choice Register Respectively |
| M, M1 | Master Control | Operated When Common Control Attached |
| ON | OFF Normal | Short Circuits One Winding of Repeat Coil to Reduce Impedence During Pulsing |
| OP | Operator | Signals Attendant to Answer Conference Circuit |
| RG | Ring | Connects Ringing Potential to Signal Called Party |
| RT | Ring Tip | Detects Answer by Called Party |
| SRG | Splash Ring | Connects Splash (Immediate) Ringing to Called Line |
| XF | | Connects Supervisory Circuit to Conference Circuit |
| 1, 2, 3, 4, 5, 6 | | Connects Conference to the Consultation Bus |

Attention is now directed to FIGS. 2 through 8 for a schematic showing of the conference circuit employed in the present invention. The details of the circuit will be explained in accordance with the particular manner in which the conference is set up.

PARTY CONTROLLED CONFERENCE

(Local Party Dials Up the Conference)

Assuming that a local party desires to set up a conference, that party will lift his receiver to provide an off-hook signal so that the common control may provide an available register and return dial tone. After receiving dial tone, the originating party dials the conference code, causing the common control to allot the conference circuit in the same manner as a trunk is normally allotted. A trunk scan directs the common control to the Dial-Up-Conference circuit and then a matrix scan is executed to select an idle path from the calling party to the Dial-Up-Conference circuit.

Figure 2:
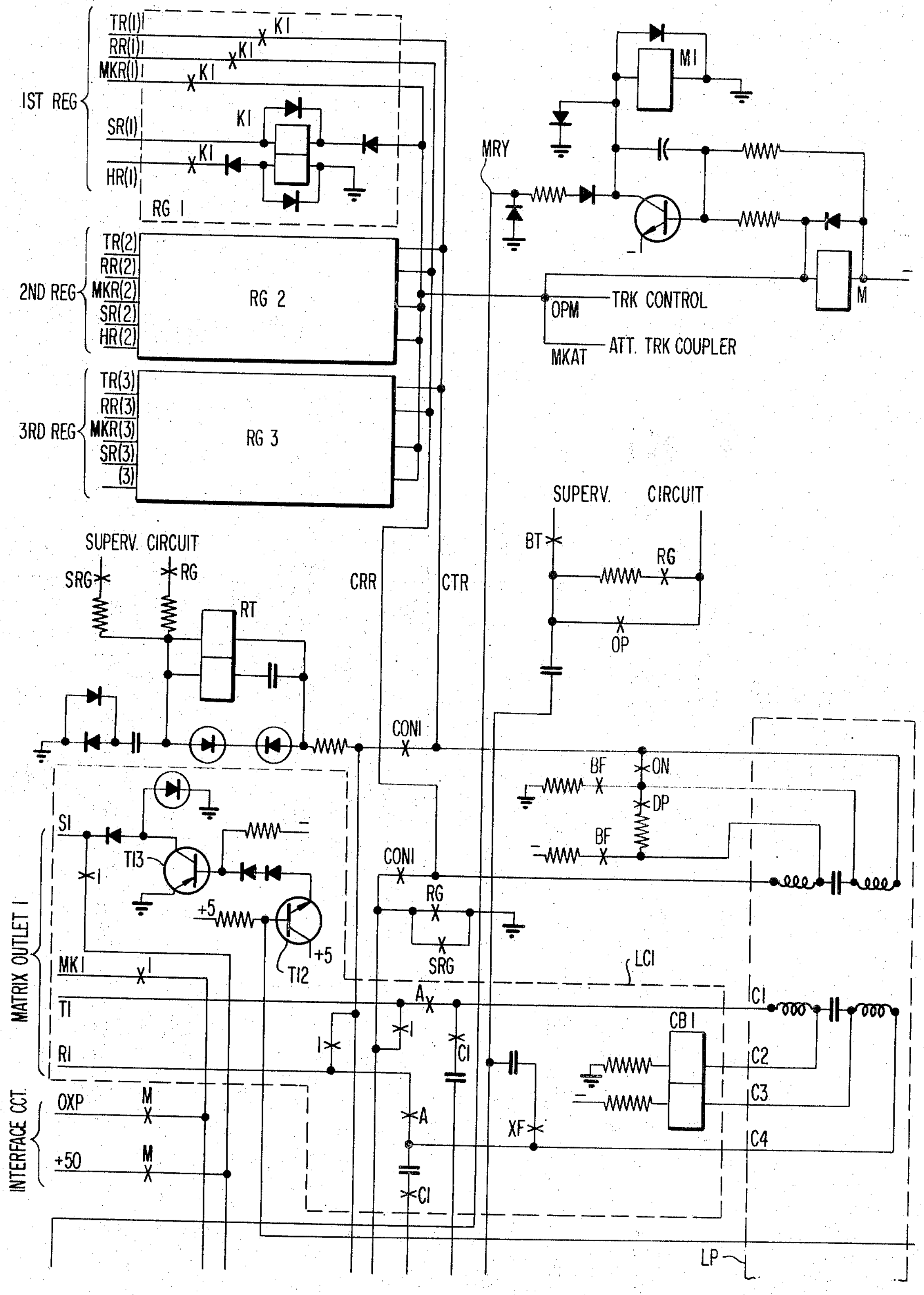
FIGS. 2 through 8 illustrate schematically the circuits employed in the conference circuit of the present invention.

From the trunk control circuit 132, as shown in FIG. 1, a signal OPM will be delivered through the M relay, shown in FIG. 2. The M relay will connect the transmission circuit of FIG. 2 to the common control. When the M relay is activated, a signal is sent to the M 1 relay within the transmission circuit and a plurality of M 1 contacts through the conference circuit are closed.

Figure 4:
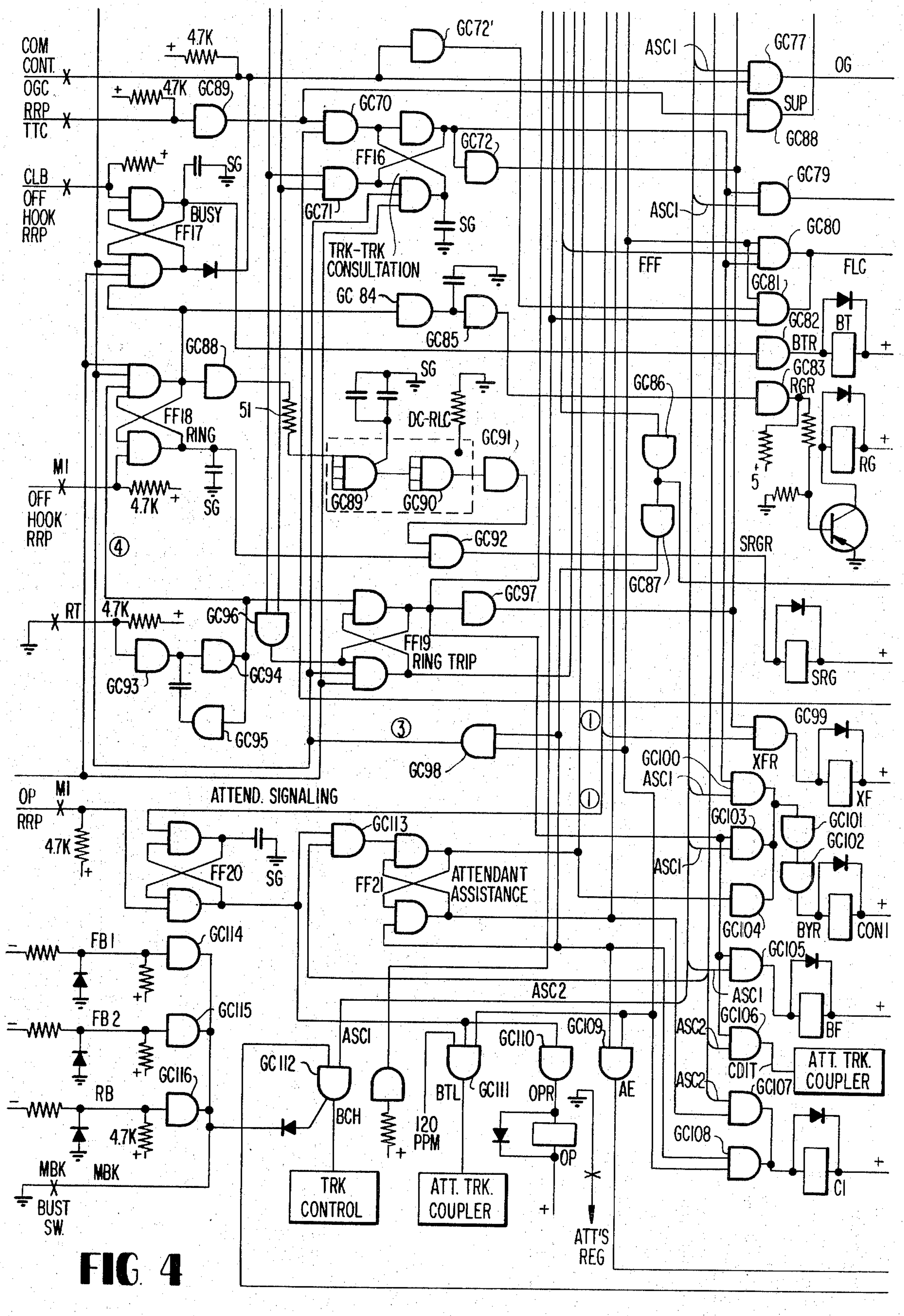

In order to set up a new path, the common control sends the seizure signal OGC (outgoing call) to the conference trunk on lead OGC shown in FIG. 4. Since the contacts M1 are closed due to the activation of the M1 relay, the signal will be transmitted to gate circuit GC77, over output lead OG to the gate circuit GC156, shown in FIG. 6, to gate circuit GC158 and ultimately to relay 1 through the energizing transistor circuit attached at the input thereto. Upon operating, relay 1 connects the OXP-lead (operate cross point) shown in FIG. 2, to the mark lead MK1 of the matrix outlet portion of the loop circuit LC1, since the M relay and the "1 " relay contacts are closed. Ground on lead OXP operates the matrix cross points of the selected path.

Figure 5:
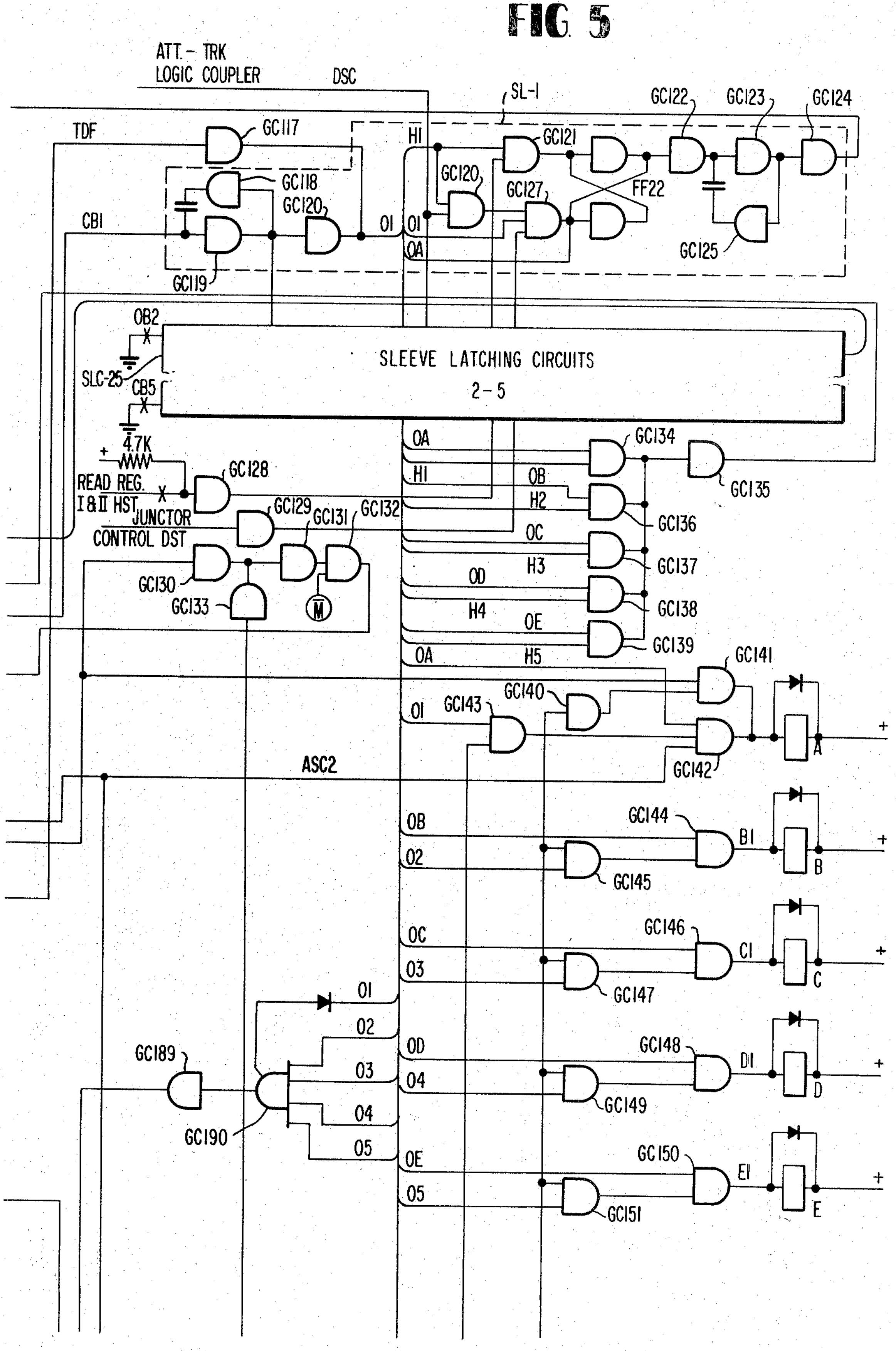

The common control also provides a signal on lead HST, shown in FIG. 5, which passes through gate circuit GC128 to the first sleeve latching circuit SL-1. This signal activates flip-flop FF22 through gate circuit GC121 which provides a latching activation signal through gate circuits GC122, GC123, and GC124 to the base of transistor T12 shown as a portion of the loop circuit LC1 of FIG. 2. The signal is then amplified and provided at matrix outlet 1 on lead S1.

The output of gate circuit GC77, shown in FIG. 4, also provides, via lead OG, a signal through gate circuit GC153, gate circuit GC143 and gate circuit GC142 to energize relay A. With the A relay energized, the A contacts in the tip and ring leads of the loop circuit, T1 and R1, respectively, will provide an energizing path for the loop supervision relay CB1, shown in FIG. 2. Relay CB1 operates over the line loop and "busies" out the conference trunk in the following manner.

When the contacts CB1, shown in FIG. 7, close, a signal is delivered through gate circuits GC43, GC40, delay circuit 1, which is made up of a capacitor and gate circuits GC38, GC39, gate circuit GC20, flip-flop FF12 to lead TDF. The TDF lead is extended from FIG. 7 to the input of gate circuit GC117 in FIG. 5. The output of flip-flop FF12 also passes through gate circuit GC41 over line RFF to gate circuit GC112, shown in FIG. 4. The output of gate circuit GC112 provides an indication signal to the trunk control.

With the CB1 relay operated, flip-flop FF22, in the sleeve latching circuit SL-1 shown in FIG. 5, will remain set via the gate circuits GC119, GC120 and GC127.

Figure 3:
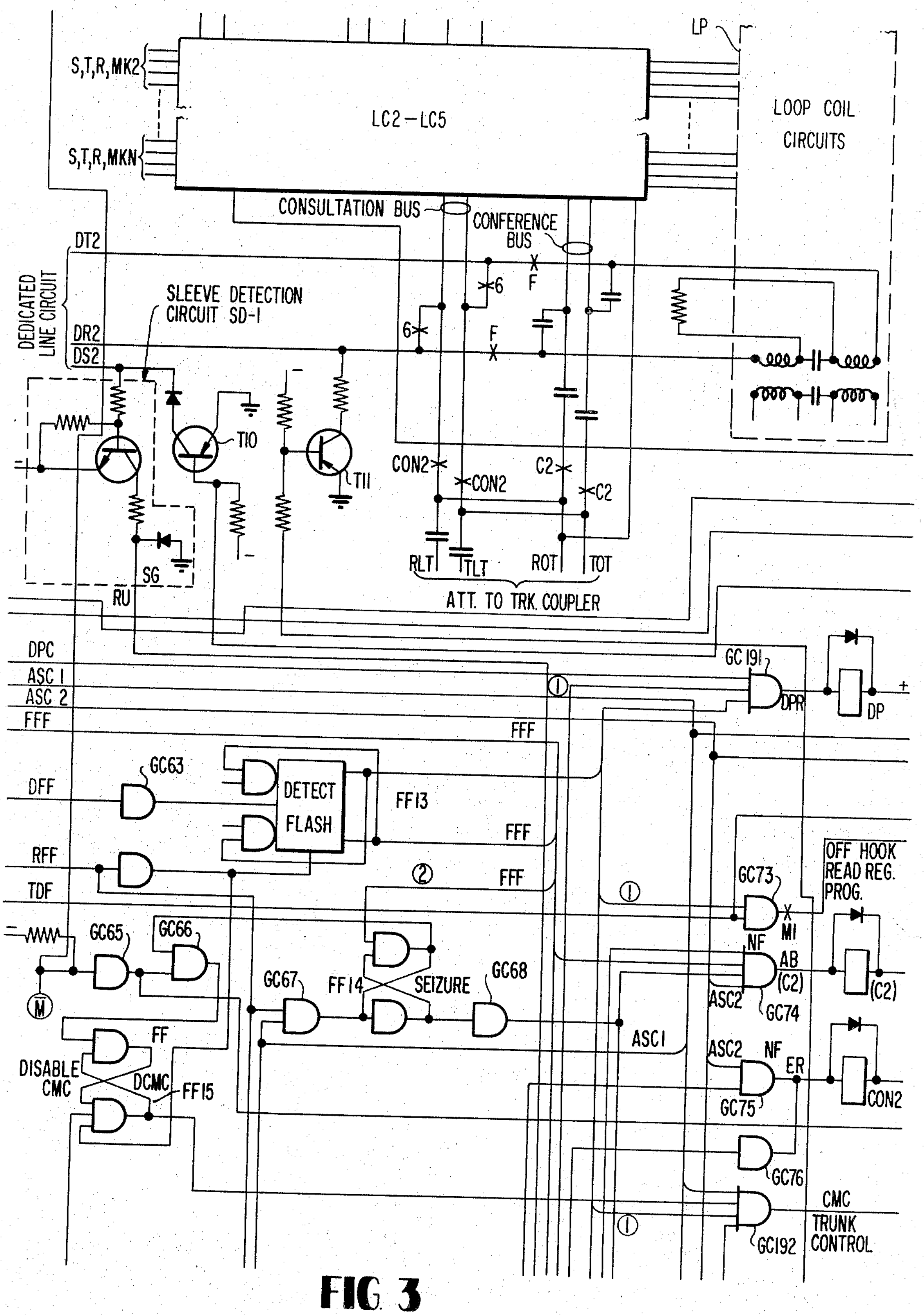

Relay CB2, within loop circuit LC2, which is shown in block diagram form in FIG. 3, (a schematic representation of the elements of each loop circuit are completely set forth in the dotted line portion referenced by loop circuit LC1) will be the next loop cicuit relay to be energized as each loop circuit LC1-LC5 is sequentially stepped for the addition of new parties to the conference.

Figure 6:
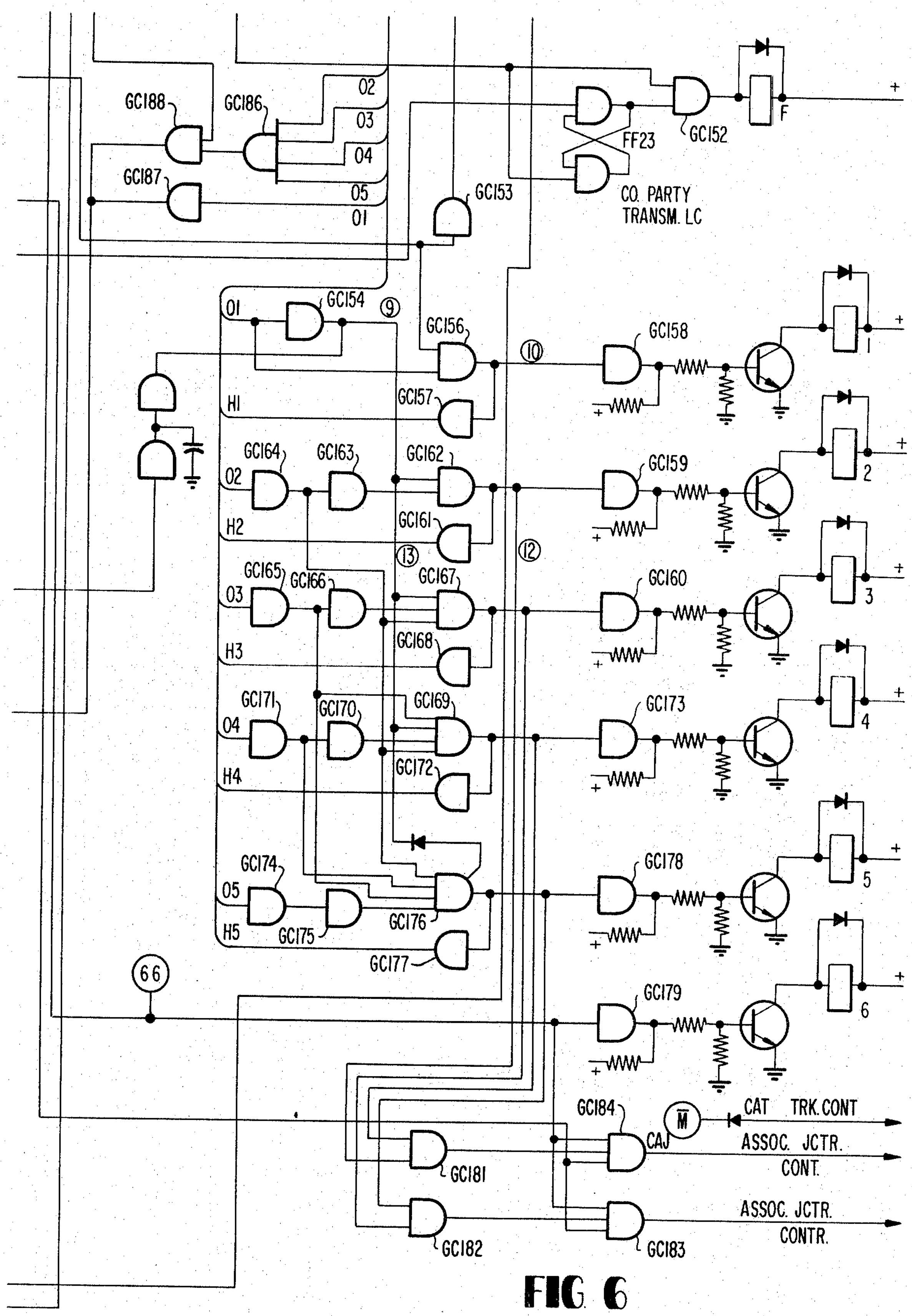

With a signal at the output of gate circuit GC117, shown in FIG. 5, a signal on lead 01 will be delivered to gate circuit GC154, shown in FIG. 6. The signal is subsequently coupled to relay number-1 through gate circuits GC155, GC156, and GC158, to release relay 1. As relay 1 is released by the signal passing through gate circuit GC154, relay number-2 is energized through gate circuit GC 162 and gate circuit GC 159. Relay number-2 then prepares the transmission circuit, shown in FIG. 2, for the next call. The common control will remove the energizing signal from the OPM lead shown in FIG. 2 so that relay M1 and M release. Party number-1 has now seized the conference circuit and is ready to perform the next step.

Party number-1 next "flashes" the hook switch to demand a register and receive dial tone. In order to flash the hook switch, party number-1 momentarily depresses the hook switch to place his set on-hook and then releases the hook switch. The on-hook duration must not exceed 2 seconds. When party number-1 goes on-hook, relay CB1 in loop circuit LC1 will be released, thereby opening the CB1 contacts connected to the input of gate circuit GC 43, shown in FIG. 7. This causes a change in state of the output of gate circuit GC43, and a signal is passed through gate circuit GC40, delay 1 to gate circuit GC20. The output of GC20 passes through gate circuit GC21 to series delay circuits delay-2 and delay 3 and is coupled via gate circuits GC32 and GC34 to start the 2 second timing circuit FF10.

When party number-1 releases the hook switch, he is again off-hook so as to cause relay CB1 to again be operated. Contacts of relay CB1 will close to send an inverted signal thorugh gate circuit GC43, gate circuit GC40, delay-1 to gate circuit GC20. Through gate circuits GC21, delay-2 and delay-3, a fourteen millisecond delay for the signal passed by gate circuit GC32 will be provided and an output pulse is then passed through gate circuit GC27 over line DFF to gate circuit GC63, shown in FIG. 3. The "detect flash" flip-flop FF13 is then triggered to provide a "high" signal on output 1 and a "low" signal on output 2. At the end of 2 seconds, the 2 second timing flip-flop FF10 will reset.

If the length of time that party number 1 is on-hook is less than 120 milliseconds, the series delay circuits delay-2 and delay-3 will prevent the enabling of gate circuit GC 27, so that the detect-flash flip-flop FF13 will ignore the faulty flash. If the on-hook condition of party 1 exceeds the 2 second limit established by 2 second timing flip-flop FF10, flip-flop FF12 will be reset, thereby providing a release signal to detect-flash flip-flop FF13, via gate circuit GC41 and gate circuit GC64, and to loop circuit LC1 over line TDF to gate circuit GC 117 to reset the sleeve latching circuit number-1 containing flip-flop FF22. If a proper flash signal is delivered to detect-flash flip-flop FF13, the output "2" thereof will provide, on line FFF, a signal which sets "seizure" flip-flop FF12. This flip-flop will remain in the set condition until party number 1 releases.

With output "1" of detect-flash flip-flop FF13 high, the input of gate circuit GC191 will be enabled and provide a signal on line DPR to operate "dial pulse" relay DP. With the closure of the contact DP, shown in the transmission circuit in FIG. 2, a loop path is provided to the registers. At the same time, a signal is provided via gates GC97 and GC99 from the "ring trip" flip-flop FF-19 to operate relay XF to prepare a path for ring back tone.

The "set" or "1" output of detect-flash flip-flop FF13 is also delivered to the gate circuit GC 192 to provide a call common control signal on the CMC to the trunk control. The trunk control then provides a signal on lead OPM, as shown in FIG. 2.

With the set output of detect-flash flip-flop FF13 being delivered to gate circuit GC73, and with relay cntact M1 closed, a signal is delivered to the OFF-HOOK/TRUNK DEMAND program within the common control to request the common control to attach a register. Upon the activation of the M relay, a signal is provided on the MRY lead at the output of the transistor circuit connected to the relay, and delivered to gate circuit GC65, and gate circuit GC66, shown in FIG. 3, to set the "disable call common control" flip-flip FF15. This will disable the call common control signal until the next demand is made.

The common control executes a "register scan" to select an idle register having access to this circuit. When a register is found, the register coupler then operates and switches the conference circuit to the register.

With a signal on the OPM lead delivered to the K1 relay in the first register circuit RG 1, that relay will operate and hold to the register by way of the K1 contact connected to the H R lead. Register circuits RG2 and RG3 are shown in block diagram form, since they are internally identical to the circuitry than register circuit TG1. The calling party now receives dial-tone from the register through the register coupler and repeat coil. Since the common controls function is now completed, the OPM signal from the common control is disabled, and M and M1 relays release.

The conference circuit is now prepared to receive dial pulses and to transmit the pulses to the register. This function is performed in the following manner. The relay CB1 follows the dial pulses as they are received. When the relay CB1 is energized, a signal is passed through gate circuit GC43, gate circuit GC40, delay-1, gate circuit GC20, GC21, over lead DPC to GC191 and dial pulse relay DP which interrupts the loop to the register. Signals at the output of gate circuit GC21 are delayed and passed to the series of gates GC22 through GC26 to the ON relay. The ON relay reduces, during the reception of dialed pulses, a portion of the impedance by shunting one coil of the repeat coil. The ON relay operates with the first pulse and releases 120 milliseconds after the last pulse of the dialed digit.

After receiving the called number, the register demands the common control. The common control executes a register scan and, upon finding the one having a demand, operates the M-relay of this circuit via lead MKR. The control then evaluates the dialed number.

From the register, a signal is transmitted over one of the MKR leads, through the K contact to the M relay, and −48 volts. The M relay then operates the M1 relay in the usual manner. The common control employs the operation of relays M and M1 for matrix scanning purposes.

With the CB1 relay operated, a signal is sent from GC44 to gate circuit GC119, GC120 to conductor 01. Conductor 01 provides a signal to gate GC154, through GC162, over conductor 12, to gate circuit GC181 and gate circuit GC184. With a signal on the CAJ leads, (control attached to junctor) a signal is sent to the associated junctor and junctor control. The common control connects ground to lead OPX and thru contacts of M and relay 2 marks one side of the matrix. The called line number is utilized by the common control to mark the line side of the matrix. A matrix scan is then executed to locate an idle path from this circuit (LC2) to the called line. When a path is found, the common control provides a signal over lead HST to gate circuit GC128 which sets the sleeve latching circuit number 2 flip-flop FF22 (2) via gate circuit GC. As was previously noted, the setting of flip-flop FF22 (2) provides a signal to the sleeve outlet lead of matrix outlet number 2, shown in FIG. 2.

In order to ring the called station, the common control sends a signal RG (ring generator signal) to the conference trunk and activates the following circuits.

With relay M1 operated, a signal on lead RG, as shown in FIG. 4, will be transmitted to the ringing-flip-flop FF18. A signal is thus transmitted through gate GC92 to the splash ring relay SRG. The SRG relay connects continuous ringing to the called party upon the closure of its contacts SRG, shown in FIG. 2. This continuous splash-ringing lasts 600 milliseconds. The setting of the "ring" flip-flop FF18 also provides a signal through GC84, GC85, and GC83 to the RG relay. The RG relay connects "interrupted" ringing to the called party and ring-back tone to the calling party. The contacts of the RG relay are also shown in FIG. 2.

When the "called" party goes off-hook the ring trip relay RT in the transmission circuit is operated. The energizing of the ring trip relay stops the ringing and ring-back tone and connects battery feed to the called party as follows.

With the relay RT energized, contact RT, shown in FIG. 4 is closed and a delayed signal is transmitted through gate circuits GC93 and GC94 to set the ring trip flip-flop FF19. The output circuit of GC94 also resets ring flip-flop FF18 to de-energize relay RG through gates GC84, GC85, and GC83. With the ring-trip flip-flop relay FF19 set, the XF relay will release through gate circuit GC97 and GC99, and gate circuit GC191 will be disabled to thereby release dial pulse relay DP.

The ring-trip flip-flop 19 provides battery feed to the called party by passing a signal from its set output to gate circuits GC103, GC101 and GC102 to the consultation No. 1 relay CON1. The secondary winding of the repeat coil is then connected through the closed contacts of the CON1 relay to the loop circuits LC2 through LC5. The set output of flip-flop FF19 is also delivered through gate circuit GC105 to battery feed relay BF. The contacts of battery feed relay BF connect the battery feed to the secondary winding of the repeat coil shown in FIG. 2.

After consultation between the calling party number 1 and the called party (No. 2), the called party can be switched into the conference buss as follows.

Party No. 1 (the controlling party) flashes his hook switch. Upon a hook-switch-flash signal, the detect-flash flip-flop FF13 reverses the potentials on its output leads 1 and 2, since the output of gate circuit GC63 is connected to the toggle input of flip-flop FF13. Output lead 2 of flip-flop FF13 (which is also designated by conductor FFF), passes a signal through gate circuits GC86, and GC87 to gate circuit GC98. The output of gate circuit GC98 resets ring-trip flip-flop FF19 and disables CMC flip-flop FF15. With "ring-trip" flip-flop FF19 reset, the battery feed relay BF is released through gate circuit GC105. Likewise, the CON1 relay is released through gate circuits GC102, GC101 and GC103 from the set output of the ring-trip flip-flop FF19. The output of gate circuit GC87 is also delivered to gate circuit GC108 to energize conference No. 1 relay C1, so as to switch party number-1 (the calling party) into the conference buss. With the closure of the C1 contacts, shown within loop circuit LC1 in FIG. 2, the R1 and T1 leads are switched into the conference buss.

The called party (2) is switched into the conference by relay B, shown in FIG. 5, in the following manner. With the output of detect flash flip-flop FF13 on lead 2 high, a signal is passed through gate circuits GC 86 and GC87 to gate circuit GC109 The output of gate circuit GC109 is delivered to each of the gate circuits GC140 through GC151, shown in FIG. 5, gate circuit 144 energizing relay B to the ring and trip contacts in the transmission circuit of the called party.

When the second loop circuit LC2 associated with another local party is energized for the called party, the closure of contacts CB2 of the second sleeve latching circuit within the group of sleeve latching circuits SLC-25, shown in FIG. 5, provides a signal on the leads 02 and 03 in the same manner that the sleeve latching circuit SL1 provides a signal on lead 01 and at the output OA of gate GC127, when the CB1 relay is energized by the calling party. Input signals on lead 02 trigger gate circuit GC145 which, in turn, together with the inverted signal on lead 0B, triggers gate circuit GC144 to energize relay B.

The signal on lead 02 also passes through gate circuits GC164, GC163 and GC162 to gate circuit GC159 to release relay number 2. Since an additional party has not yet been connected into the circuit LC3 by the operation of relay CB3, the line 03 is high. As a result of the high on lead 9 and on lead 13, at the output of gate circuit GC164, the output of gate circuit GC166 will enable gate circuit GC167, to provide a signal to gate circuit GC160 so as to energize relay-3. As a result, the next loop circuit in the chain of loop circuits LC1-LC5 is ready for an additional party. Thus, whenever additional parties are to be added to the conference circuit, the conference trunk automatically steps through the available loop circuits to make room for that additional party. Three additional parties may be added by party number-1 in a similar manner to adding party number-2.

LOCAL PARTY SETS UP CONFERENCE WITH CENTRAL OFFICE PARTY

Should party number 1 desire to set up a conference with a central office party included, the central office party must be connected first. The party number 1 dials the digits 9, which will switch him to a central office trunk as follows. First, party number one must gain access to the conference circuit by dialing the conference access code as previously described. Then party number 1 flashes, receives dial tone from an attached register, and dials the desired trunk code (usually 9).

With the common control attached to a register, ground from the register is applied on a MKR lead to the transmission circuit of FIG. 2 through one of the register circuits. Assuming that register circuit number 1, RG1, is employed, ground will be applied through the contracts of relay K1 and ultimately to the M relay. The M relay operates the M1 relay and the read register program portion of the common control provides a signal over lead TTC, shown in FIG. 4, through the closed contacts of relay M1 to gate circuit GC69. The "trunk-trunk consultation" flip-flop FF16 is then set and provides a low on the output of gate circuit G78, to transistor T11, so as to provide signal on the ring lead of the loop circuit for the line circuit "dedicated" or permanently associated with the conference circuit, hereinafter referred to as the dedicated line circuit. The low or ground provided over the SUP lead is employed for identification of the dedicated line circuit. With a signal on the lead 1, because of the seizure of calling party number 1, gate circuit GC190 will provide a signal through gate circuit GC133, circuits GC131 and GC132, shown in FIG. 5, to the base of transistor T10 to provide ground on the sleeve lead DS2.

The output of the trunk-trunk-consultation flip-flop FF16 is also passed to gate circuit GC79 and delivered to gate circuit GC179 to thereby energize relay 6. Upon the closure of the contacts of relay 6, shown in FIG. 6, the consultation buss is now connected to the dedicated line circuit. The dial pulse relay DP receives a signal from the output of gate circuit GC191 and closes its contacts, while the set output of the trunk-trunk consultation flip-flop FF16 provides a signal through gate circuits GC100–GC102 to energize the CON1 relay, whereby the transmission loop circuit is switched to the dedicated line circuit.

At the same time, the inverted set output of trunk-trunk-consultation flip-flop FF16 via gate circuits GC72 passes through gate circuit GC99 and releases relay XF. The release of XF disconnects the path to the supervisory circuit, as shown in FIG. 2.

After the common control has identified the line, it sets up a path to an idle central office trunk. Common control releases relays M, M1 and K. The calling party hears central office dial tone and dials the central office number. After answer, the central office party can be then switched into the conference in the following manner.

With the hook-switch-flash toggling flip-flop FF13 as previously described, the reset output thereof will provide a low on the output of gate circuit GC80 over line FLC to the "calling party transmission flip-flop" FF23. With flip-flop FF23 set, a signal will pass through gate circuit GC152 to energize relay F for connecting the dedicated line circuit to the conference buss. The reset output of the flip-flop FF13 also passes through gate circuits GC86 and GC87 to provide a signal through gate circuit GC108, to energize relay C1, thereby switching the calling party in to the conference as shown in FIG. 2. The output of gate circuit GC87 is inverted by gate circuit GC98 and delivered to the trunk-trunk consultation flip-flop FF16, to reset the latter. Once flip-flop FF16 is reset, relay 6 and relay CON1 are released through gate circuits GC79 and GC102, respectively.

Upon the central office party being connected to the conference buss, calling party number-1 may add other parties if desired by employing the same procedure of switch flashing to demand a register and, once dial tone is received and a register is attached, the number of the local party number 2 to be added is dialed. Ring-back tone and consultation is provided and another hook switch flash will switch party number 2 and into the conference buss. Parties 3, 4 and 5 can be added in the same manner.

PARTY CONTROLLED CONFERENCE WITH ATTENDANT'S ASSISTANCE

When a local party sets up a conference of one central office party and additional local parties, he must initiate connection of the central office party. If a conference has already been set up, and a party wishes to add the central office party to the conference, that party must ask for the assistance of the PABX attendant (operator).

After receiving dial tone, through the use of the hook switch flash as previous discussed, the local party (party number 1) dials the digit 0.

The common control connects to the register and provides a signal thru the register on lead MKR to operate relays M and M1 as previously discussed. A signal is also provided from the read register program portion of the common control on lead OP shown in FIG. 4, through the closed contacts of relay M1 to set the "attendant signalling" flip-flop FF20. The output of flip-flop FF20 passes through gate circuit GC111 to an attendant to trunk coupler. The coupler will provide a signal to the conference lamp on the attendant's turret and a 120 PPM signal will flash brightly, due to pulses on lead 120 PPM. The output of the attendant signalling flip-flop FF20 is also connected to gate circuit GC110 to relay OP which provides signal ground to the attendant's register through contacts OP. This signals the chime at the attendant's turret, thereby providing the attendant with an audible as well as visual signal. Relay OP also provides ringback tone to party number 1.

The common control will then disconnect the register from the conference trunk and relays M, M1 and K will release.

Assuming attendant number-1 answers, when the attendant presses the conference key on her turret, the lamp on turret number 1 will flash dimly at 120 pulses per minute and the lamp on turret number 2 will be illuminated with a dim steady signal. Inputs from the attendant to trunk coupler on lead AS2 and the 120 pulse per minute signal from the supervisory circuit are connected via gates GC42, GC51, GC48 and GC47 to lead DL1 which is connected to the 1st attendant's turret, referred to as turret number 1. A low input on lead AS1 is connected to gate circuit GC50 and gate circuit GC49 to lead DL2 to turret number 2.

Each of the inputs AS1 and AS2 is connected to gate circuit GC46, through gate circuit GC45, to the RFF output of gate circuit GC41. Gate GC41 causes the detect-flash flip-flop FF13 to be reset via gate circuit GC64. With flip-flop FF13 reset, flip-flops FF20 and FF21 will be reset and set, respectively. The output of flip-flop FF21 is connected via gate circuit GC107 to release relay C1, so as to disconnect the calling party from the conference buss, while the set output of attendant-assistance flip-flop FF21 causes relay CON1 to operate via gate circuits GC104, GC101 and GC102, to switch the calling party to the consultation buss.

The output of gate circuit GC45, shown in FIG. 8, initiates a delay signal through gate circuit GC53, GC54 and GC55 over leads ASC 2 so as to set the attendant-assistance flip-flop FF21 through gate circuit GC113. After the period of delay provided by signal ASC 2, gate circuit GC107 will disable relay C1. The reset output of attendant-assistance flip-flop FF21 is also connected to gate circuit GC74 to prevent relay C2 from operating. The set output of attendant-assistance flip-flop FF21, on the other hand, energizes relay CON1 through circuits GC104-GC101-GC102. In addition, the set output of FF21 energizes relay CON 2 through GC76.

With consultation set up between calling party number 1 and the attendant, the calling party asks the attendant to dial the central office party and switch it into the conference. In order to do this, the attendant will key dial the desired trunk code (usually the digit 9); as the attendant initiates dialing, the calling party is switched back into the conference buss via relay C1 in the following manner.

A signal SPO1 from the attendant's register 1 is delivered at the input gate circuit GC57, shown in FIG. 8, and is sent over lead FFF to gate circuit GC86. The output of gate circuit GC87, which is coupled with the GC86 reset attendant-assistance flip-flop FF21 and energized relay C1 through gate circuit GC107, which is connected to the reset output of FF21. With flip-flop FF21 reset, relays CON1 and CON2 are de-energized.

After the digit 9 has been evaluated, the attendant is connected with a central office trunk and a new path from the dedicated line circuit to the selected central office trunk is established. Relay M and relay M1 are operated from the common control, and trunk-trunk-consultation flip-flop FF16 is set via a signal over lead TTC, through closed contacts M1 and gate circuits GC69 and GC70. The output of trunk-trunk-consultation FF16 is connected through gate circuit GC78 over the SUP lead to the base of transistor T11, shown in FIG. 3 to place ground on the ring lead DR2 for identification. With the trunk-trunk-consultation flip-flop FF16 set, a signal is passed through gate circuit GC80 over lead FLC to the calling-party-transmission flip-flop FF23, which operates the relay F through gate circuit GC152, so as to switch the loop to the central office trunk.

The common control next disconnects the attendant from the conference trunk and connects her to the selected central office trunk as follows. The common control releases the attendant-trunk coupler which connects the attendant to the conference trunk and operates the coupler which connects the attendant to the selected central office trunk.

Upon the attendant trunk coupler being released, the input AS1, shown in FIG. 8, goes high, thereby causing lead FFF, which is connected to gate circuit GC57, to go high. The signal on lead FFF then passes through gate circuit GC86 and GC87 and is inverted via gate circuit GC98, so as to reset trunk-trunk consultation flip-flop FF16. When the central office party answers, the attendant may pursue one of the following conference before retiring from the call. The attendant can press the local split key and have a consultation with the cofnerence parties while the central office party holds over the loop; the attendant can press the release split key, which will connect her to the conference parties and to the central office party; or the attendant can immediately press the attendant release key on her turret and switch the central office party to the conference.

"LOST CALL" Party Controlled Conference With Attendant Assistance

As was previously noted in connection with the length of time that a party is on-hook, the timing flip-flop FF10 is employed to reset flip-flop FF12 in the event that the on-hook condition of party number 1 exceeds a 2 second limit. Should party number 1 delay the hook-switch flash, he would be disconnected from the conference circuit. If party number 1 desires to get back into the conference and continue his conversation, he must ask the attendant for assistance.

After receiving the dial tone, party number 1 dials attendant's code which, as has been previously indicated, is represented by the digit "zero".

Party number 1 is connected to the attendant via an attendants' trunk. The attendant, after obtaining the number of the calling party and his request to re-enter the conference, requests the calling party to hand up. The attendant then enters the conference trunk by pressing the associated conference key on the turret. The attendant then establishes a connection from the conference trunk to party number 1 in the same manner as described in section headed "Attendant Controlled Conference".

ATTENDANT CONTROLLED CONFERENCE

(Central Office Party Connected To The Conference First)

Rather than the local party asking the attendant for assistance after setting up a conference with other local parties, the attendant may control the conference completely (the central office party is connected first in this instance).

To set up the conference, the attendant begins by being connected to a central office trunk. This may be the result of having answered an incoming call from the central office or she may connect to an idle central office trunk and establish an outgoing call. On an outgoing call, after receiving central office dial tone, the attendant dials the number of the called party and, after consulting with that party, the attendant presses the local split key on her turret. The central office party remains in a hold condition through a loop in the central office trunk.

The attendant then keys the number of the dedicated line of the conference circuit and seizes the conference circuit as follows. With the dedicated line circuit seized, ground on the DS2 lead will be connected to the input of the sleeve detection circuit SD1. The output RU thereof is passed to gate circuit GC112, shown in FIG. 4 and to the trunk control. The conference trunk is now busied out.

In order to switch local parties into the conference, the attendant enters the conference trunk by pressing the conference trunk key on her turret. The central office trunk is switched through and the central office party hears ringback tone provided by the central office trunk. A signal from the attendant-to-trunk coupler on lead AS1 is passed through circuits GC46 and GC45 over lead ASC1 to gate circuit GC77. The output of GC77, shown in FIG. 4, is passed over line OG the gate circuit GC156, shown in FIG. 6. Gate circuit GC156 energizes the relay 1 through gate circuit GC158. The closure of the contacts of relay 1 switches the consultation buss to the matrix outlet of loop circuit LC1.

The attendant then keys the local number and, upon pressing the first key, the conference trunk logic is switched from the conference condition to a consultation condition.

When input SPO1 from the attendant's register 1 goes high, a signal at the input of gate circuit GC57, shown in FIG. 8, provides a low signal over lead FFF to set seizure flip-flop FF14. After the desired line number has been keyed, the common control is attached to the attendant's register, and relays M and M1 operate from a signal on lead MKAT from the attendant-to-trunk coupler.

The common control establishes a matrix path to the called line as previously described and provides a "hold switch train" signal HST, to indicate that a matrix outlet number 1 should be held, to the input of gate circuit GC128, flip-flop FF22 in sleeve latching circuit SL-1. The output of flip-flop FF22 is connected to loop circuit LC1 to provide a hold path for a sleeve lead S1. The common control then provides an RG signal to set the ring flip-flop FF18, so as to operate the "splash ring" and ring relays SRG and RG. Ringing is provided to party number 1 and ringback tone is sent to the attendant. The control then releases relays M and M1.

When the called party answers the call, relay RT operates and relay CON2 connects the attendant to the consultation buss in the following manner. When relay RT resets FF18, a signal is provided through gate circuits GC84, GC85 and GC83 to release relay RT. A signal on lead 4 sets a ring-trip relay FF19 which provides an enabling signal through gate circuit GC75 to operate relay CON2.

After consultation, the attendant switches party number-1 and the central office party to the conference buss by pressing the central office split key. Upon pressing the central office split key, a low signal from the attendant's register 1 on lead SPO1 is connected to gate circuit GC57 over lead FFF, through gate circuits GC86, GC87 and GC109, to the output AE thereof. Gate circuit GC109 is connected to the input of the A relay through the gate relays GC140 and GC141. When the A relay operates, the circuit for the relay CB1 in loop circuit LC1 is closed.

Relay CB1 being operative, the CB1 contacts are closed and a signal is delivered on lead 01, as previously explained. The signal is inverted by gate circuit GC154 and passed to gate circuit GC107, shown in FIG. 4. Relay C1 then operates and switches party number-1 to the conference buss.

The attendant is switched from a consultation buss (relay CON2 releases) to the conference buss via relay C2 which operates in the following manner. With the detect-flash flip-flop set, the gate circuit GC180 enables the "central office party transmission" flip-flop FF23 to pass a signal through gate signal GC152 to operate the F relay. This switches the central office party into the conference. The ring-trip flip-flop 19 is reset from the output of gate circuit GC90 and releases relay CON2 to gate circuit GC75. With lead FFF high, gate circuit GC74 is low, so as to operate relay C2. The ringing and consultation chain of latching circuits then steps one step ahead, relay-1 releases and relay-2 operates, as previously described, for the addition of other parties. The attendant releases a path to another desired local party in the same manner.

ATTENDANT CONTROLLED CONFERENCE (Local Party Is Switched Into The Conference First)

Where the conference is controlled by an attendant and a local party is switched into the conference, the attendant presses the conference trunk key on her turret and busies out the conference trunk and access to the dedicated line circuit.

A signal on input lead AS1 from the attendant to trunk coupler provides a signal through gate circuit CG46 and CG45 to lead ASC1, so as to provide a high signal at the output of gate circuit GC112, which is connected to the trunk control circuit. When lead ASC1 goes high, gate circuit GC188 is disabled and trunk-trunk consultation flip-flop FF12 is reset, so as to provide ground through gate circuit GC78 to the base of transistor T11 shown in FIG. 3. Ground is then provided on the sleeve lead to the dedicated line circuit. The local and central office parties are switched into the conference as previously described.

We claim:

1. In an automatic telephone switching system including a private branch exchange, a plurality of local station positions, an attendant's position associated with said exchange and a central office party position and a central office trunk connected thereto and terminating at said private branch exchange, a conference circuit also associated with said private branch exchange and having a plurality of conference connections, said connections providing switchable communication paths between said positions, said conference circuit including means, responsive to the control of any one of said positions, for establishing a conference connection between any number of local station positions, whereby a conference may be set up either by said attendant or any one of said local stations, and means, associated with said conference circuit and said attendant's position, for connecting said central office party position to said conference under the exclusive control attendant's position, and further including a plurality of line circuits, each of which is respectively associated with each local station position within said plurality of said local station positions, a switching matrix associated with said line circuits and said conference circuit for providing said switchable communication paths, a register associated with said line circuits and said conference circuit receiving digits dialed by a subscriber at one of said positions, a common control circuit for controlling the operations of said system and a dedicated line circuit connected to said switching matrix and said central office trunk for providing the communication path for said control office party position to the other line circuits within said conference, and further including a trunk control circuit and an attendant-to-trunk coupler associated with said attendant's position for coupling signals from said attendant's position to said conference circuit, and wherein said conference circuit includes a plurality of transmission circuits respectively associated with the line circuit at each local station and said dedicated line circuit and connected with said attendant's position through said attendant-to-trunk coupler and to said trunk control circuit, and further including a first control circuit for connecting said transmission circuits to said common control circuit in response to signals delivered from said trunk control circuit.

2. A telephone system according to claim 1, wherein said first control circuit comprises a first relay control circuit for effecting the connection of said transmission circuits to said common control circuit.

3. A telephone system according to claim 2, further including a first logic control circuit responsive to said common control circuit for enabling the connection of a transmission circuit to said switching matrix whereby a designated line circuit may be connected to said conference circuit.

4. A telephone circuit according to claim 3, further including a second relay control circuit responsive to said common control circuit and said first logic control circuit for providing ring and tip connections to said designated line circuit from a connected transmission circuit.

5. A telephone system according to claim 4, further including a transmission path logic circuit connected with said second relay circuit and responsive to said common control circuit for preventing access to said designated line circuit by another party exclusive of said conference circuit once said designated line circuit has been connected with said conference circuit.

6. The telephone system according to claim 5, wherein said transmission path logic circuit includes a plurality of sleeve latching circuits respectively connectable with said transmission circuits and a corresponding plurality of control logic circuits associated with said latching circuits for controlling the operation of said second relay control circuit.

7. A telephone system in accordance with claim 6, further including an additional relay control logic circuit and a corresponding relay circuit associated therewith, responsive to said first logic control circuit for controlling the connection of said conference circuit to said dedicated line circuit through an auxiliary transmission circuit associated therewith.

8. A telephone system in accordance with claim 6, wherein the plurality of control logic circuits includes means for successively enabling the second relay control circuits for providing transmission paths to consecutive line circuits as said line circuits are added to said conference.

9. A telephone system in accordance with claim 7, wherein each transmission circuit includes a transmission relay circuit responsive to off-hook signals from a line circuit associated therewith and wherein said conference circuit further includes a third logic control circuit responsive to the operation of the transmission circuit relay for enabling a calling subscriber associated with a line circuit having access to said conference circuit through said switching matrix, to set up a conference connection among other subscriber line circuits.

10. A telephone system in accordance with claim 9, wherein said third logic control circuit includes a first timing circuit responsive to the operation of a transmission relay for providing connection signals from said conference circuit to said register, whereby said subscriber may be connected to said register for transmission of dial pulses representative of a called party thereto.

11. A telephone system in accordance with claim 10, wherein said timing circuit further includes a first control delay circuit connected thereto for releasing the calling subscriber from said conference circuit upon receipt of an improper access signal from a calling subscriber's line circuit.

12. A telephone system in accordance with claim 10, wherein said first logic control circuit includes a first logic storage circuit responsive to said third logic control circuit for delivering a first gating signal to said common control circuit for attaching a register to said conference.

13. A telephone system in accordance with claim 12, further including a register connection circuit connected to said first logic control circuit and said common control circuit for holding a register to said conference circuit during the reception of dial pulses from a subscriber.

14. A telephone system in accordance with claim 13, wherein said first logic control circuit further includes a second logic storage circuit responsive to signals from said common control circuit representing the receipt of dial pulses from said subscriber for providing ringing control signals to the calling part and further including a third logic storage circuit responsive to an off-hook condition signal delivered from the line circuit of a called party for disabling said second logic storage circuit and providing a battery feed signal to the transmission circuit associated with said called party.

15. The telephone system according to claim 14, wherein said first logic control circuit includes means responsive to a momentary on-hook condition signal delivered from the line circuit of the calling party subsequent to the delivery of battery feed to the line circuit of the calling party for closing the transmission paths of said calling and called parties by their respective line circuits and said conference circuit, whereby said calling and called parties will be switched into the conference.

16. A telephone system according to claim 15, wherein said first logic control circuit further includes a fourth logic storage circuit, responsive to a signal generated by said common control circuit, in response to the delivery of a first preassigned digit signal from the line circuit of said calling party, for connecting the transmission circuit associated with said dedicated line circuit with said central office trunk.

17. A telephone system according to claim 16, wherein said second logic control circuit further includes a fifth logic storage circuit, responsive to the momentary on-hook condition of said calling party, for energizing said auxiliary control relay circuit, whereby said central office party may be connected with said conference.

18. The telephone system in accordance with claim 17, wherein said first logic control circuit includes a sixth logic storage circuit, responsive to signals from said common control circuit representative of the receipt of a second preassigned digit signal from the line circuit of a calling party and coupled to said attendant-to-trunk coupler, for generating a signal at the attendant's turret, so as to inform the attendant of the need for assistance in setting up a conference.

19. The telephone system in accordance with claim 18, wherein said third logic control circuit includes trunk-coupler gating circuitry responsive to signals generated at said attendant's turret for controlling the operation of said first control logic circuit, whereby a conference may be set up from said attendant's position.

20. A telephone system in accordance with claim 19, wherein said first logic control circuit further includes a seventh storage logic circuit, responsive to a signal generated by said common control circuit in response to the delivery of the first preassigned digit signal from said attendant turret, for connecting the transmission circuit associated with said dedicated line circuit with said central office trunk.

* * * * *